(12) United States Patent
Päivike et al.

(10) Patent No.: US 7,171,195 B2
(45) Date of Patent: Jan. 30, 2007

(54) METHOD AND APPARATUS FOR ENABLING A MOBILE STATION TO ADAPT ITS REVISION LEVEL BASED ON NETWORK PROTOCOL REVISION LEVEL

(75) Inventors: Heikki M. Päivike, Kempele (FI); Mikko U. Korpela, Raahe (FI); Antti O. Kangas, Oulunsalo (FI)

(73) Assignee: Nokia Corporation, Espoo (FI)

( * ) Notice: Subject to any disclaimer, the term of this patent is extended or adjusted under 35 U.S.C. 154(b) by 237 days.

(21) Appl. No.: 10/702,913

(22) Filed: Nov. 6, 2003

(65) Prior Publication Data

US 2004/0137894 A1 Jul. 15, 2004

Related U.S. Application Data

(60) Provisional application No. 60/432,075, filed on Dec. 9, 2002.

(51) Int. Cl.
*H04M 3/00* (2006.01)
(52) U.S. Cl. ........................ 455/419; 370/342
(58) Field of Classification Search ........... 455/517, 455/522, 445, 552.1, 509, 418, 450, 440, 455/419; 370/342, 352, 347, 328–329; 709/228; 375/141
See application file for complete search history.

(56) References Cited

U.S. PATENT DOCUMENTS

| | | | |
|---|---|---|---|
| 5,818,603 A | 10/1998 | Motoyama | 358/296 |
| 6,104,929 A * | 8/2000 | Josse et al. | 455/445 |
| 6,125,122 A | 9/2000 | Favichia et al. | 370/466 |
| 6,353,620 B1 | 3/2002 | Sallberg et al. | 370/465 |
| 6,490,271 B1 * | 12/2002 | Erjanne | 370/347 |
| 6,718,179 B1 * | 4/2004 | Forssell et al. | 455/509 |
| 6,748,220 B1 | 6/2004 | Chow et al. | 455/450 |
| 6,782,274 B1 * | 8/2004 | Park et al. | 455/552.1 |
| 6,856,812 B1 * | 2/2005 | Budka et al. | 455/522 |
| 2002/0071480 A1 * | 6/2002 | Marjelund et al. | 375/141 |
| 2002/0082033 A1 * | 6/2002 | Lohtia et al. | 455/517 |
| 2002/0126630 A1 * | 9/2002 | Vanttinen et al. | 370/328 |
| 2002/0133600 A1 * | 9/2002 | Williams et al. | 709/228 |

(Continued)

OTHER PUBLICATIONS

"3rd Generation Partnership Project; Technical Specification group GSM EDGE Radio Access Network; Mobile radio interface layer 3 specification, Radio Resource Control Protocol (Release 1999)", 3GPP TS 04.18 V8.11.0 (Sep. 2001), pp. 145-146, 198-201.

(Continued)

*Primary Examiner*—Duc Nguyen
*Assistant Examiner*—Michael T. Vu
(74) *Attorney, Agent, or Firm*—Harrington & Smith, LLP (57) ABSTRACT

This invention provides a method of operating a mobile station (MS), and a MS (10), that includes in one aspect adapting a protocol revision level in a MS Classmark information element (IE) to follow a protocol revision of a wireless network, and that includes in another aspect adapting a Quality of Service (QoS) information element sent by the MS to a Serving General Packet Radio Service (GPRS) Support Node (SGSN) release version in the wireless network. In a further embodiment this invention provides a method of operating a MS that includes adapting operation of the MS to Enhanced General Packet Radio Service (EGPRS) capabilities of a serving cell of a wireless network.

32 Claims, 3 Drawing Sheets

U.S. PATENT DOCUMENTS

| | | | |
|---|---|---|---|
| 2002/0141359 A1* | 10/2002 | Jei | 370/329 |
| 2003/0112793 A1* | 6/2003 | Sengodan | 370/352 |
| 2003/0125061 A1* | 7/2003 | Bysted et al. | 455/517 |
| 2004/0109431 A1* | 6/2004 | Abrahamson et al. | 370/342 |
| 2004/0203981 A1* | 10/2004 | Budka et al. | 455/522 |
| 2005/0101309 A1* | 5/2005 | Croome | 455/418 |

OTHER PUBLICATIONS

"Support of R99 Mobile Stations in R97 Network", 3GPP TSG-GERAN Meeting #10, Jun. 28, 2002, 4 pages.

"Potential transition problem when switching MSC revision from R98 to R99", 3GPP TSG GERAN WG2 meeting #11-bis Oct. 11, 2002, 2 pages.

* cited by examiner

METHOD AND APPARATUS FOR ENABLING A MOBILE STATION TO ADAPT ITS REVISION LEVEL BASED ON NETWORK PROTOCOL REVISION LEVEL

CLAIM OF PRIORITY FROM A COPENDING U.S. PROVISIONAL PATENT APPLICATION

This patent application claims priority under 35 U.S.C. 119(e) from Provisional Patent Application No. 60/432,075, filed Dec. 9, 2002, the content of which is incorporated by reference herein in its entirety.

TECHNICAL FIELD

These teachings relate generally to wireless communications networks and, more specifically, relate to cellular telecommunications networks containing mobile terminals or mobile stations (MSs), such as cellular telephones, and network infrastructure equipment.

BACKGROUND

The MS Classmark (CM) information elements (IEs) 1 and 2 contain MS/UE (user equipment) specific information that is descriptive of MS capabilities and the protocol reference version, such as the revision level of the MS protocol software. The IE is included in some Radio Resource management messages as well as in Mobility Management messages, such as the LOCATION UPDATING REQUEST message. This particular IE has been defined since the Global System for Mobile Communications (GSM) Phase 1 in standard GSM TS 04.08, and more recently in the Third Generation Partnership Project (3GPP) standard TS 24.008 for Release 1999 (R99) and later releases.

Since the protocol versions in GSM phase 1, GSM phase 2 and R99 differ substantially from one another, there is a requirement that all MSs should indicate their support of GSM phase 1, GSM phase 2 or R99 (and later) version of the protocol when attempting to register with the wireless network.

When a network detects a MS that is operating with an earlier protocol version level than the current version level of the network, the network is thereby informed that it is not to use signalling elements and procedures that would not be backwards compatible with the MS that is operating in accordance with the earlier revision level. In practice, the network is typically able to perform a fallback to the previous version of the protocol, thereby assuring compatibility with the MS.

When a network detects the presence of a MS having a later protocol version level than that of the current network protocol, then the network is obviously unable to switch to an operational capability that was defined later than the network's reference version of the protocol. However, this is normally not a problem since the (later) protocol is or should be designed to cope with such situations. If this were not done, then (by example) the introduction of GSM phase 2 and R99 MSs would need to be delayed until every network in the world had been updated to the same protocol revision level in order to insure interoperability.

A similar problem was previously identified when moving from GSM phase 1 to phase 2, and is documented in GSM 09.90, v4.9.0, in clause 5.3.6.1 (annex 4).

As was discussed in a publication Tdoc GP-021695, presented by Nokia Corporation at 3GPP TSG-GERAN meeting #10, Helsinki, 24–28 Jun. 2002, it has been found that some networks fail to provide service to R99 MSs that, according to the R99 requirements, indicate their revision level in the Mobile Station Classmark 1 and 2 IEs. As the problem appears to be in the serving network, it thus affects both home (HPLMN) users and roaming users, if they have a R99 or later MS. The problem is also not limited to any specific radio access network or core network, as any single mode or multi-mode R99, or later, MS is rejected in the same way. In fact, a large number of the existing commercial networks currently reject a Classmark IE that contains a R99 revision level, meaning that a R99 MS cannot obtain service in about half of the currently existing GSM networks.

It may be the case that one reason for this failure mode is a non-uniform interpretation of the meaning of the statement "reserved for future use" by writers of network protocol software, as some implementors of network software may interpret this to mean the same as the defined term "reserved", which if encountered by the network is intended to trigger error handling procedures.

In addition to the rejection of the R99 MS Classmark, as discussed above, other compatibility problems have been observed. For example, the following errors concerning interoperability with R99 MSs have been observed in R97/R98 GSM networks.

Mismatch of R99/R97 Send Sequence Numbers

This error has been described in detail in Tdoc G2-020790, presented by Ericsson in 3GPP TSG GERAN WG2 meeting #11-bis, Atlanta Ga., 7–11 Oct. 2002. The consequence of this common error is that R99 terminals do not obtain any service from the network since the location update procedure fails. This error only occurs if the upgrade from R97 to R99 in the network is performed in an inconsistent manner.

Certain R97 Serving General Packet Radio System (GPRS) Support Node (SGSN) Implementations do not Accept the R99 Quality of Service (QoS) Information element During field testing it has been discovered that there are R97/R98 SGSNs in commercial use that do not accept the R99 QoS information element. The R99 QoS information element has been defined in 3GPP TS 24.008 V3.12.0, clause 10.5.6.5 to be a fixed length, type 4 IE with a length of 13 bytes. The rejection of the R99 QoS IE by a R97 SGSN is an implementation error, since the R97 QoS information element defined in 3GPP TS 04.08 V6.18.0, clause 01.5.6.5, is a fixed length, type 4 IE with a length of five bytes. A correct SGSN implementation should decode only the known length of this IE, i.e., five bytes, and skip the remaining eight bytes added in the R99 version of the specification. For a R97 receiver, an IE longer than expected is not to be considered an error (see 04.07, ch 11.2). In R99, the QoS parameters defined for R99 should always be used in the air interface (see 23.107 ch. 9.1.2.1).

Incorrect Padding of Control Messages Leading to GPRS Failure

During field testing it has been discovered that there exist R97/R98 Base Station Systems (BSS) in commercial use that incorrectly terminate a Temporary Block Flow (TBF) resource assignment message. This results in a situation in which a correctly implemented R99 MS sees R99 extension parameters assigning an Enhanced GPRS (EGPRS) TBF to the MS. Therefore, a R99 MS either accepts the message (if the MS supports EGPRS) or rejects the message (if the MS does not support EGPRS). In both cases, however, the TBF fails (either the establishment of or the operation on the TBF) and leads to a situation in which GPRS cannot be used at all by the MS.

SUMMARY OF THE PREFERRED EMBODIMENTS

The foregoing and other problems are overcome, and other advantages are realized, in accordance with the presently preferred embodiments of these teachings.

This invention provides a method of operating a mobile station (MS), and a MS that operates in accordance with the method that includes adapting a protocol revision level in a MS Classmark information element (IE) to follow a protocol revision of a wireless network by (a) determining the revision level of the network from at least one bit received from the network; if the bit has a value "0", (b) setting the Revision Level field in MS Classmark 1 and 2 information elements to a value used by GSM Phase 2 mobile stations; and if the bit has a value "1", (c) setting the Revision Level field in the MS Classmark 1 and 2 information elements to a value used by R99 and later mobile stations. Determining the revision level of the network includes reading a MSCR (Mobile Switching Center Revision) field in a Control Channel Description IE of a SYSTEM INFORMATION TYPE 3 message sent by the network to the MS.

This invention also provides a method of operating a MS, and a MS that operates in accordance with the method that includes adapting a Quality of Service (QoS) information element sent by the MS to a Serving General Packet Radio Service (GPRS) Support Node (SGSN) release version in a wireless network by (a) determining the SGSN revision of a GPRS core network from at least one bit received from the network; if the bit has a value of "0", (b) setting a R97 compatible QoS information element in a message sent to the network; and if the bit has a value of "1", (c) setting a R99 compatible QoS information element in the message sent to the network. In one embodiment determining the SGSN revision entails reading a SGSNR (SGSN Release) field that is part of a SI 13 Rest Octets information element sent in a SYSTEM INFORMATION TYPE 13 message on a Broadcast Control Channel (BCCH), while in another embodiment determining the SGSN revision entails reading the SGSNR field that is part of Packet System Information messages sent over a Packet Broadcast Control Channel (PBCCH). In the preferred embodiment the message sent to the network by the MS is one of an ACTIVATE PDP CONTEXT REQUEST Message, a MODIFY PDP CONTEXT REQUEST Message and an ACTIVATE SECONDARY PDP CONTEXT REQUEST Message.

In a further embodiment this invention provides a method of operating a MS, and a MS that operates in accordance with the method that includes adapting operation of the MS to Enhanced General Packet Radio Service (EGPRS) capabilities of a serving cell of a wireless network by (a) receiving a Temporary Block Flow (TBF) Resource Assignment message; (b) determining whether the cell supports EGPRS; if the cell does support EGPRS, (c) completely decoding the TBF Resource Assignment message; and if the cell does not support EGPRS, (d) only partially decoding the TBF Resource Assignment message by terminating the decoding after the content specified for R97 is decoded. In one embodiment the TBF Resource Assignment message is an IMMEDIATE ASSIGNMENT for Downlink (DL) TBF establishment message.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
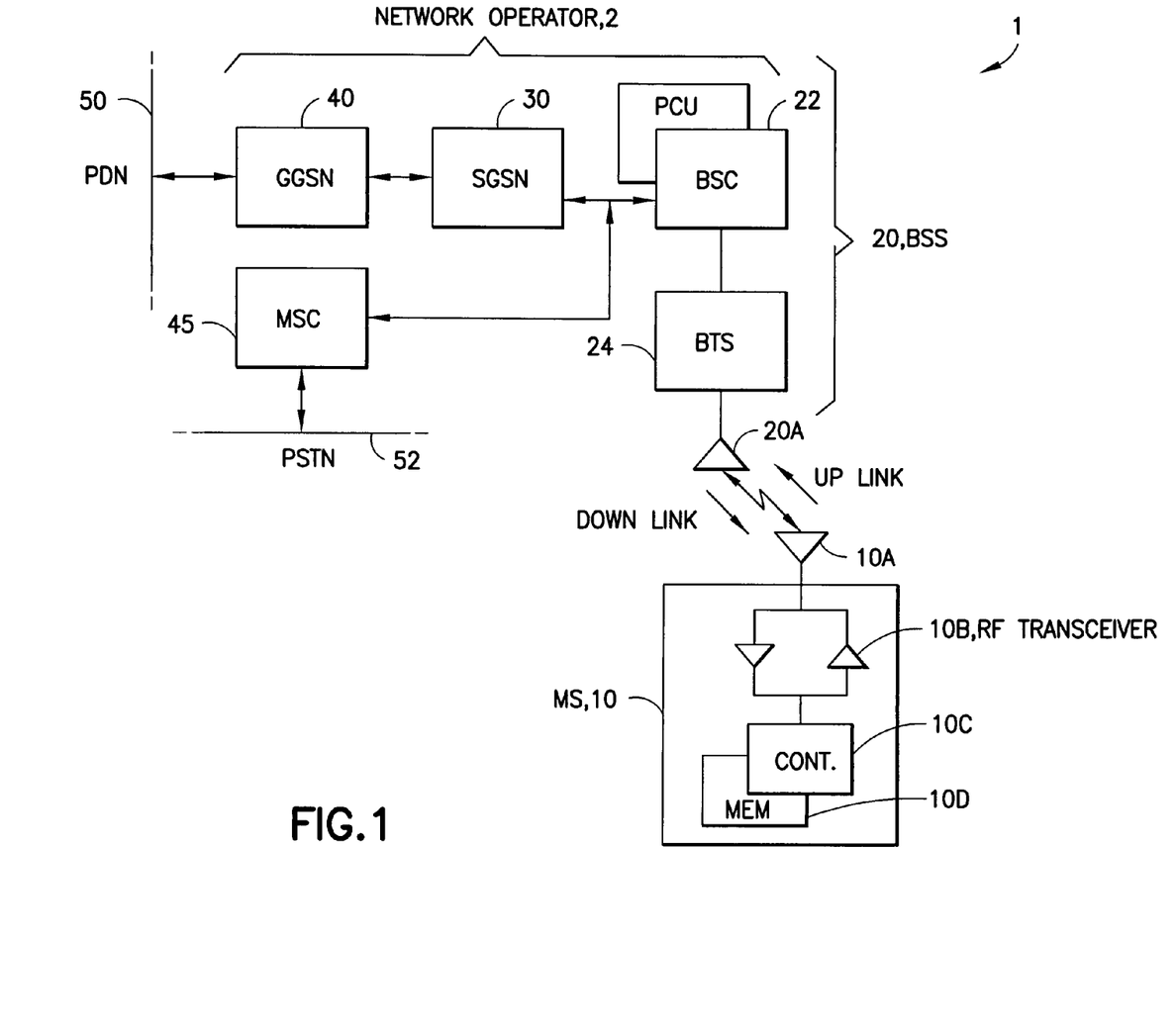
FIG. 1 is simplified block diagram of a wireless communications system having at least one MS and a network, and that is suitable for practicing this invention.

In order to place the ensuing discussion into a technological context, reference is made to FIG. 1 for showing a simplified block diagram of a wireless communications system 1. The system 1 includes a number of hardware and software units associated with a network operator 2, also referred to herein as network infrastructure or simply as the network, and at least one MS 10 . The MS 10 includes an antenna 10A for conducting bidirectional radio frequency (RF) communications with an antenna 20A of a BSS 20. The MS 10 typically further includes an RF transceiver (Transmitter and a Receiver) 10B that is coupled to a data processor 10C, such as a microprocessor based controller (CONT), which may include a digital signal processor (DSP). The data processor 10C is responsive to a stored program read from a memory (MEM) 10D so as to operate in accordance with the various embodiments of this invention, as detailed below.

The BSS 20 includes a Base Station Controller/Packet Control Unit (BSC/PCU) 22 and at least one, but typically a number of Base Transceiver Stations (BTS) 24, each supporting a cell. The BSC/PCU 22 is bidirectionally coupled to a Serving GPRS Support Node (SGSN) 30, that in turn is bidirectionally coupled to a Gateway GPRS Support Node (GGSN) 40. The GGSN 40 is bidirectionally coupled to a Packet Data Network (PDN) 50, such as the Internet. A Mobile Switching Center (MSC) 45 coupled to a public switched telephone network (PSTN) 52 is provided for making circuit switched voice calls. The other typical circuit switched equipment for enabling conventional voice calls is not shown in order to simplify the drawing.

This invention provides the following improvements and enhancements to the system 1 of FIG. 1 in order to overcome the problems that were discussed above. It should be noted that not all of these improvements and enhancements need be implemented in any one network/MS environment. That is, the teachings of this invention may be practiced in any given network/MS environment by implementing just one of the following several improvements and enhancements, or by implementing just two of the following several improvements and enhancements, or by implementing all (or less than all) of the following several improvements and enhancements.

Adaptive Classmark

The first two error modes discussed above, i.e., the rejection of the R99 MS Classmark and the mismatch of the R99/R97 send sequence numbers, may be corrected by adapting the revision level in the MS 10 Classmark IE to follow the protocol revision of the network 2.

Figure 2:
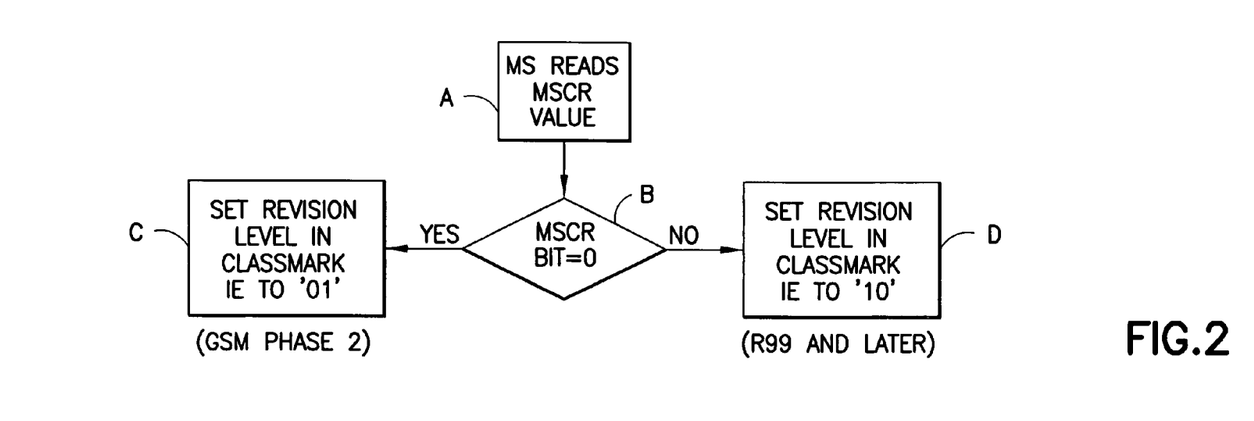
FIG. 2 is a logic flow diagram explaining the operation of the MS when performing an adaptive Classmark procedure.

Referring to FIG. 2, and in greater detail, in Step A the MS 10 determines the revision level of the network 2 by reading the MSCR (Mobile Switching Center Revision) field in the Control Channel Description IE of the SYSTEM INFORMATION TYPE 3 message sent by the network 2 (see 3GPP TS 04.18 V8.13.0 (2002-02), sections 9.1.35 and 10.5.2.11).

In Step B the MS 10 examines the MSCR bit. If the MSCR bit has a value "0" (R98 or earlier), at Step C the MS 10 sets the Revision Level field in its Classmark 1 and 2 information elements to the value "01" (used by GSM phase 2 mobile stations).

If the MSCR bit has a value "1" (R99 and later), at Step D the MS 10 sets the Revision Level field in its Classmark 1 and 2 information elements to the value "10" (used by mobile stations supporting R99 or later versions of the protocol).

Reference can be made in this regard to the description of the Classmark 1 IE in 3GPP TS 24.008, Version 3.b.0, clause 10.5.1.5.

In all other aspects the MS 10 operates according to the R99 version of the air interface protocol.

The above described process removes the effect of the first error discussed above, the rejection of the R99 MS Classmark, because the network 2 recognizes the MS 10 as a GSM Phase 2 mobile station. This is beneficial, as a large number of GSM Phase 2 mobile stations are currently in use, and are not known to have any compatibility problems with R97 networks. The R99 MS 10 can still, however, in all other aspects use the R99 version of air interface protocol. This is possible because backwards compatibility is a requirement between R99 and R97.

Figure 3:
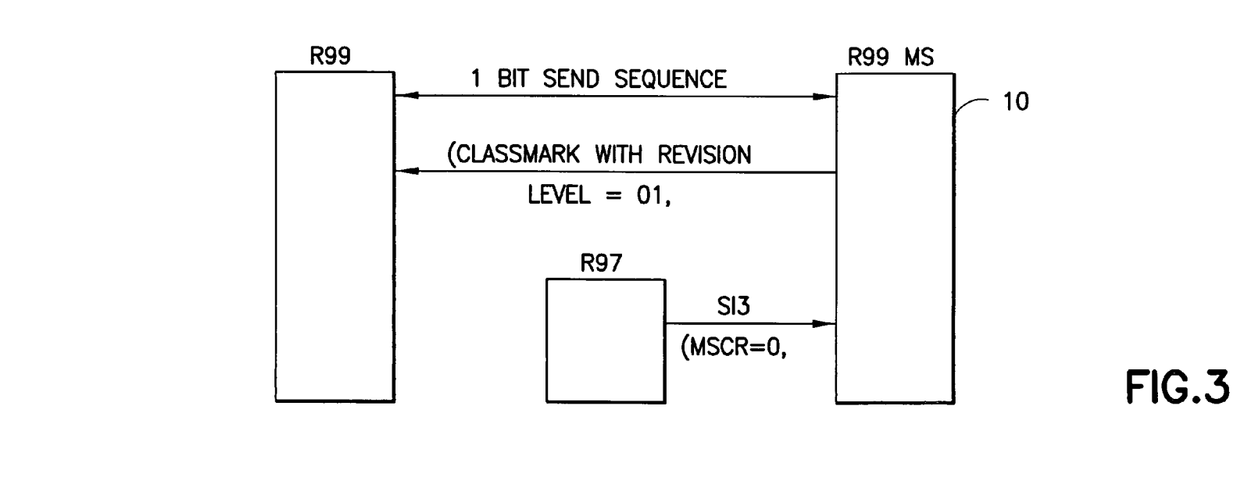
FIG. 3 is a diagram that is useful when explaining the signal flow between the MS and the network of FIG. 1, in accordance with an aspect of this invention.

The above described process also removes the effect of the second error described above, the mismatch of the R99/R97 send sequence numbers, as is shown in FIG. 3. Assume that the network 2 indicates that the MSC 45 is of vintage R98 or earlier (MSCR=0). Therefore, the MS 10 indicates in its Classmark IE that it is a GSM Phase 2 mobile station, as defined in Step C above. Consequently the MSC 45 assumes that the MS 10 will use one bit send sequence numbers. The MS 10 actually will use one bit send sequence numbers, since the MSCR indicates that the MSC 45 is compatible with the R98, or earlier, protocol. As such, no MSC/MS mis-match is possible (see 3GPP TS 24.007, chapter 11.2.3.2).

It should be noted that it may happen that the MS 10 re-selects to a cell that broadcasts a different MSC 45 Revision than the current cell. In this case the MS 10 first receives the SYSTEM INFORMATION TYPE 3 from the new cell before attempting any access. Therefore, in the event that the new network has a different MSCR than the current network, the MS 10 automatically adapts to this situation (i.e., it takes a different path in FIG. 2).

It may also happen that the MS 10 is handed over to a new cell that broadcasts a different MSCR. In this case as well the MS 10 receives the SYSTEM INFORMATION TYPE 3 message before attempting access, and is thus informed of the MSCR value (Step A of FIG. 2).

The MS 10 may also employ other methods than the use of the MSC Revision field when determining the protocol version of the network 2, or certain of the network elements. For example, the contents of the SI2ter broadcast message or the presence of the SI2quarter broadcast message can be used to determine if the Radio Access Network (BSC 22) is of the R99 revision or not.

Adaptive QoS

The third error that was discussed above can be avoided by the MS 10 adapting the QoS information element sent by the MS 10 to the SGSN 30 release version broadcast by the network 2.

Figure 4:
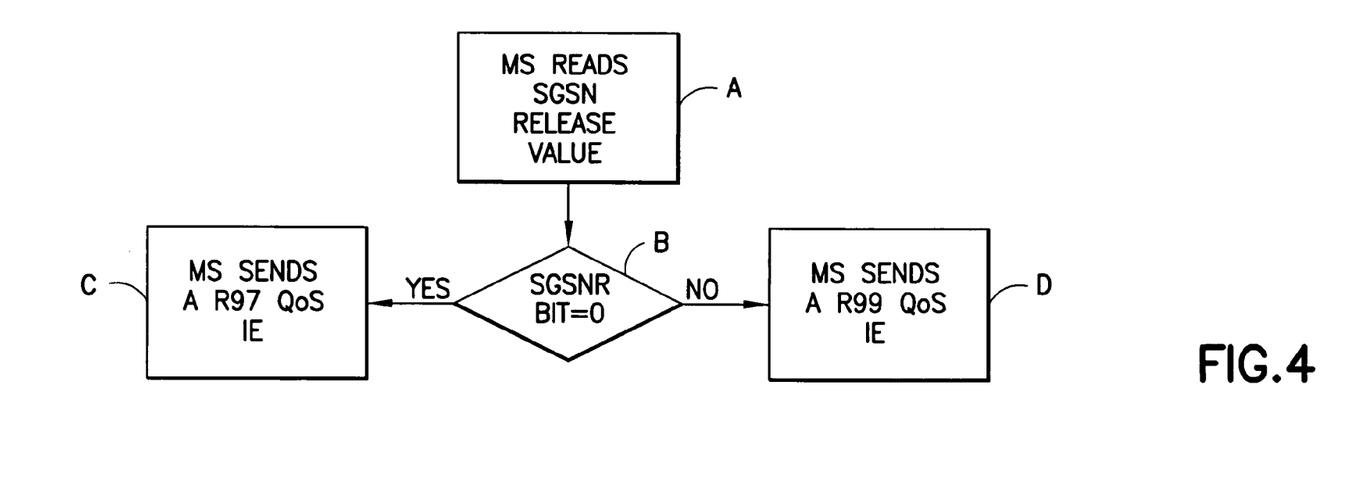
FIG. 4 is a logic flow diagram explaining the operation of the MS when performing an adaptive QoS procedure.

Referring to FIG. 4, the MS 10 determines at Step A the SGSN 30 revision of the GPRS core network. This can be done by reading the SGSNR (SGSN Release) field that is part of the SI 13 Rest Octets information element sent in the SYSTEM INFORMATION TYPE 13 message on the Broadcast Control Channel (BCCH), or in Packet System Information messages in the case of the Packet Broadcast Control Channel (PBCCH). Reference in this regard can be made to 3GPP TS 04.18 V8.13.0, clauses 9.1.43.a and 10.5.2.37b. At Step B the MS 10 examines the value of the SGSN Release field bit.

If the SGSNR field has a value of "0" (the SGSN 30 is of Release '98 or earlier), then at Step C the MS 10 sends a R97 compatible QoS information element in the "ACTIVATE PDP CONTEXT REQUEST" Message, the "MODIFY PDP CONTEXT REQUEST" Message and the "ACTIVATE SECONDARY PDP CONTEXT REQUEST" Message.

If SGSNR field has a value of "1" (the SGSN 30 is of Release '99 or later), then at Step D the MS 10 sends a R99 compatible QoS information element in the "ACTIVATE PDP CONTEXT REQUEST" Message, the "MODIFY PDP CONTEXT REQUEST" Message and the "ACTIVATE SECONDARY PDP CONTEXT REQUEST" Message.

It should be noted that it can occur that the MS 10 will re-select to a cell that broadcasts has a different SGSN Release value than the current cell. In this case the MS 10 will first receive a SYSTEM INFORMATION TYPE 13 Message, or a PACKET SYSTEM INFORMATION TYPE 1 Message, from the new cell before establishing a Packet Data Protocol (PDP) Context. As such, in the event that the new network has a different SGSNR, the MS 10 will adapt its QoS IE accordingly.

Adaptation to Cell EGPRS Support

The fourth error described above is overcome by the MS 10 determining whether EGPRS is supported in a cell, and then decoding the assignment message based on this information. The EGPRS support indicator is present in the GPRS Cell Options IE only in R99 and later (see 3GPP TS 04.60 v6.14.0 for R97, v8.15.0 for R99). In this manner any EGPRS or non-EGPRS R99 MS can operate with a network 2 that experiences the EGPRS problem as described above.

Figure 5:
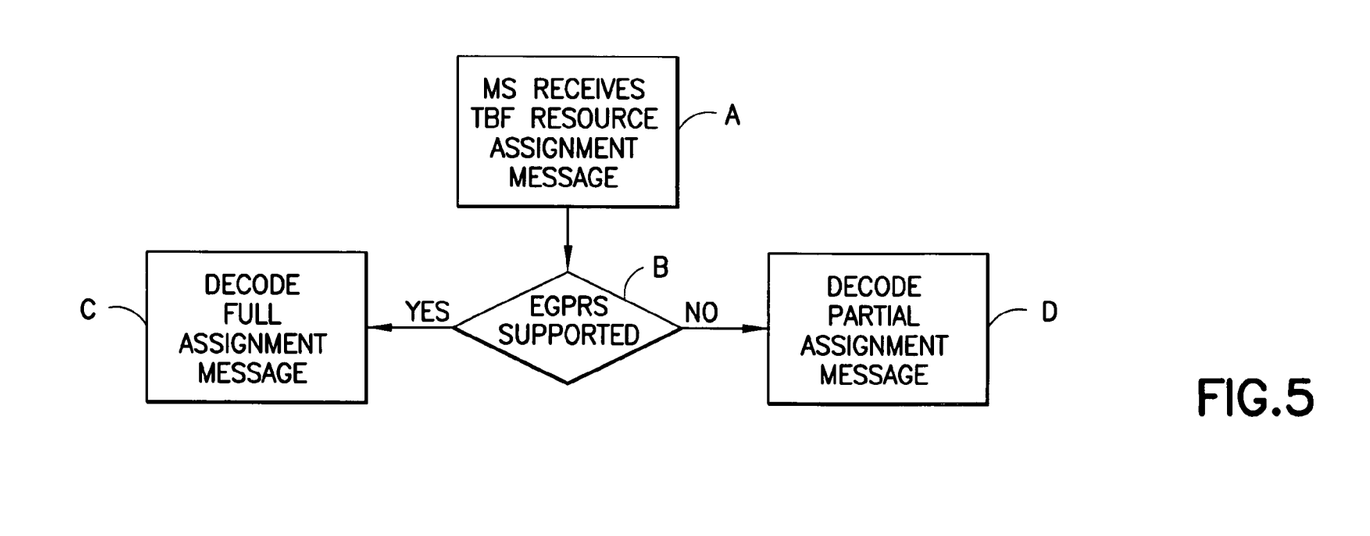
FIG. 5 is a logic flow diagram explaining the operation of the MS when adapting to cell EGPRS support.

In greater detail, and referring to FIG. 5, a TBF resource assignment message (an IMMEDIATE ASSIGNMENT for DL TBF establishment message in this particular case) is received by the MS 10 at Step A. At Step B the MS 10 checks whether the cell supports EGPRS. If the cell does support EGPRS, the assignment is decoded completely at Step C. If the cell does not support EGPRS, st Step D the decoding of the assignment is terminated after the content specified for R97 is decoded. In this manner, since there is no R99-related information present in the undecoded portion, the possibility of incorrectly set spare padding does not cause the message to be ignored, and the desired GPRS operation becomes possible to accomplish.

The foregoing description has provided by way of exemplary and non-limiting examples a full and informative description of the best method and apparatus presently contemplated by the inventors for carrying out the invention.

However, various modifications and adaptations may become apparent to those skilled in the relevant arts in view of the foregoing description, when read in conjunction with the accompanying drawings and the appended claims. As but some examples, the use of other similar or equivalent information elements, message types and system network types may be attempted by those skilled in the art. Furthermore, the foregoing operating principles can be applied as well to other messages where erroneous content may trigger an error situation, as the MS 10 is enabled, in accordance with this invention, to filter errors in downlink messages based on the signaled network capabilities. However, all such and similar modifications of the teachings of this invention will still fall within the scope of this invention.

Furthermore, and as was noted above, some of the features of the present invention could be used to advantage without the corresponding use of other features. For example, only one of the foregoing corrective measures may be employed by the MS 10, or in any case less than all of the corrective measures may be employed. As such, the foregoing description should be considered as merely illustrative of the principles of the present invention, and not in limitation thereof.

What is claimed is:

1. A method of operating a mobile station (MS), comprising:
    adapting a protocol revision level in a MS Classmark information element (IE) to follow a protocol revision of a wireless network by
    determining the revision level of the network from at least one bit received from the network;
    if the bit has a value "0", setting the Revision Level field in MS Classmark 1 and 2 information elements to a value used by GSM Phase 2 mobile stations; and
    if the bit has a value "1", setting the Revision Level field in the MS Classmark 1 and 2 information elements to a value used by Release 1999 (R99) and later mobile stations.

2. A method as in claim 1, where determining the revision level of the network includes reading a MSCR (Mobile Switching Center Revision) field in a Control Channel Description IE of a SYSTEM INFORMATION TYPE 3 message sent by the network to the MS.

3. A method as in claim 1, further comprising transmitting the Revision Level field in the MS Classmark 1 and 2 information elements from the mobile station to the network, and in the network, providing service to the mobile station regardless of whether the mobile station is R99 or later compatible, or is compatible with a release earlier than R99.

4. A method as in claim 1, further comprising transmitting the Revision Level field in the MS Classmark 1 and 2 information elements from the mobile station to the network, and for the case where the Revision Level field is set to a value used by GSM Phase 2 mobile stations, operating with one bit send sequence numbers whether the mobile station is R99 or later compatible, or is compatible with a release earlier than R99.

5. A method of operating a mobile station (MS), comprising:
    adapting a Quality of Service (QoS) information element (IE) sent by the MS to a release version of a Serving General Packet Radio Service (GPRS) Support Node (SGSN) in a wireless network by
    determining the SGSN revision of a GPRS core network from at least one bit received from the network;
    if the bit has a value of "0", setting a Release 1997 (R97) compatible QoS information element in a message sent to the network; and
    if the bit has a value of "1", setting a Release 1999 (R99) compatible QoS information element in the message sent to the network.

6. A method as in claim 5, where determining the SGSN revision comprises reading a SGSNR (SGSN Release) field that is part of a SI 13 Rest Octets information element sent in a SYSTEM INFORMATION TYPE 13 message on a Broadcast Control Channel (BCCH).

7. A method as in claim 5, where determining the SGSN revision comprises reading a SGSNR (SGSN Release) field that is part of Packet System Information messages sent over a Packet Broadcast Control Channel (PBCCH).

8. A method as in claim 5, where the message sent to the network is one of an ACTIVATE PDP CONTEXT REQUEST Message, a MODIFY PDP CONTEXT REQUEST Message and an ACTIVATE SECONDARY PDP CONTEXT REQUEST Message.

9. A method of operating a mobile station (MS), comprising:
    adapting operation of the MS to Enhanced General Packet Radio Service (EGPRS) capabilities of a serving cell of a wireless network by
    receiving a Temporary Block Flow (TBF) Resource Assignment message;
    determining whether the cell supports EGPRS;
    if the cell does support EGPRS, completely decoding the TBF Resource Assignment message; and
    if the cell does not support EGPRS, only partially decoding the TBF Resource Assignment message by terminating the decoding after the content specified for Release 1997 is decoded.

10. A method as in claim 9, where the TBF Resource Assignment message is an IMMEDIATE ASSIGNMENT for Downlink (DL) TBF establishment message.

11. A mobile station (MS), comprising an antenna coupled to a radio frequency (RF) transceiver that is coupled to a data processor, said data processor being responsive to a stored program for adapting a protocol revision level in a MS Classmark information element (IE) to follow a protocol revision of a wireless network by determining the revision level of the network from at least one bit received from the network via said antenna and said RF transceiver; said data processor being responsive to a condition that the at least one received bit has a value "0" to set the Revision Level field in MS Classmark 1 and 2 information elements to a value used by GSM Phase 2 mobile stations, and is further responsive to a condition that the at least one received bit has a value "1" to set the Revision Level field in the MS Classmark 1 and 2 information elements to a value used by Release 1999 (R99) and later mobile stations.

12. A MS as in claim 11, where said data processor, when determining the revision level of the network, reads a MSCR (Mobile Switching Center Revision) field in a Control Channel Description IE of a SYSTEM INFORMATION TYPE 3 message sent by the network to the MS.

13. A MS as in claim 11, where said data processor is further responsive to the stored program to transmit the Revision Level field in the MS Classmark 1 and 2 information elements to the network via said antenna and RE transceiver such that the network provides service to the MS regardless of whether the MS is R99 or later compatible, or is compatible with a release earlier than R99.

14. A MS as in claim 11, where said data processor is further responsive to the stored program to transmit the Revision Level field in the MS Classmark 1 and 2 information elements to the network via said antenna and RF transceiver such that, for the case where the Revision Level field is set to a value used by GSM Phase 2 mobile stations, said MS and the network operate with one bit send sequence numbers whether the MS is R99 or later compatible, or is compatible with a release earlier than R99.

15. A mobile station (MS), comprising an antenna coupled to a radio frequency (RF) transceiver that is coupled to a data processor, said data processor being responsive to a stored program for adapting a Quality of Service (QoS) information element (IE) sent by the MS to a release version of a Serving General Packet Radio Service (GPRS) Support Node (SGSN) in a wireless network, said data processor operating to determine the SGSN revision of a GPRS core network from at least one bit received from the network via said antenna and said RF transceiver, said data processor being responsive to a condition that the bit has a value of "0" to set a Release 1997 (R97) compatible QoS information element in a message sent to the network, and is further responsive to a condition that the at least one received bit has a value of "1" to set a Release 1999 (R99) compatible QoS information element in the message sent to the network.

16. A MS as in claim 15, where said data processor, when determining the SGSN revision, reads a SGSNR (SGSN Release) field that is part of a SI 13 Rest Octets information element sent by the network in a SYSTEM INFORMATION TYPE 13 message on a Broadcast Control Channel (BCCH), and that is received through said antenna and RF transceiver.

17. A MS as in claim 15, where said data processor, when determining the SGSN revision, reads a SGSNR (SGSN Release) field that is part of Packet System Information messages sent by the network over a Packet Broadcast Control Channel (PBCCH), and that is received through said antenna and RF transceiver.

18. A MS as in claim 15, where said data processor sends the message to the network as an ACTIVATE PDP CONTEXT REQUEST Message.

19. A MS as in claim 15, where said data processor sends the message to the network as a MODIFY PDP CONTEXT REQUEST Message.

20. A MS as in claim 15, where said data processor sends the message to the network as an ACTIVATE SECONDARY PDP CONTEXT REQUEST Message.

21. A mobile station (MS), comprising an antenna coupled to a radio frequency (RF) transceiver that is coupled to a data processor, said data processor being responsive to a stored program for adapting operation of the MS to Enhanced General Packet Radio Service (EGPRS) capabilities of a serving cell of a wireless network, said data processor operating to receive, via said antenna and said RF transceiver, a Temporary Block Flow (TBF) Resource Assignment message and to determine whether a cell supports EGPRS, said data processor being responsive to a condition that the cell does support EGPRS to completely decode the TBF Resource Assignment message, said data processor being further responsive to a condition that the cell does not support EGPRS so as to only partially decode the TBF Resource Assignment message by terminating the decoding after a content specified for a Release 1997 MS is decoded.

22. A MS as in claim 21, where the TBF Resource Assignment message is an IMMEDIATE ASSIGNMENT for Downlink (DL) TBF establishment message.

23. A computer program embodied on a tangible computer-readable medium for directing a data processor during operation of a mobile station (MS), comprising operations of:

adapting a protocol revision level in a MS Classmark information element (IE) to follow a protocol revision of a wireless network by determining the revision level of the network from at least one bit received from the network;

if the bit has a value "0", setting the Revision Level field in MS Classmark 1 and 2 information elements to a value used by GSM Phase 2 mobile stations; and if the bit has a value "1", setting the Revision Level field in the MS Classmark 1 and 2 information elements to a value used by Release 1999 (R99) and later mobile stations.

24. A computer program as in claim 23, where the operation of determining the revision level of the network includes an operation of reading a MSCR (Mobile Switching Center Revision) field in a Control Channel Description IE of a SYSTEM INFORMATION TYPE 3 message sent by the network to the MS.

25. A computer program as in claim 23, further comprising an operation of transmitting the Revision Level field in the MS Classmark 1 and 2 information elements from the mobile station to the network, and in the network, providing service to the mobile station regardless of whether the mobile station is R99 or later compatible, or is compatible with a release earlier than R99.

26. A computer program as in claim 23, further comprising an operation of transmitting the Revision Level field in the MS Classmark 1 and 2 information elements from the mobile station to the network, and for the case where the Revision Level field is set to a value used by GSM Phase 2 mobile stations, operating with one bit send sequence numbers whether the mobile station is R99 or later compatible, or is compatible with a release earlier than R99.

27. A computer program embodied on a tangible computer-readable medium for directing a data processor during operation of a mobile station (MS), comprising operations of:

adapting a Quality of Service (QoS) information element (IE) sent by the MS to a release version of a Serving General Packet Radio Service (GPRS) Support Node (SGSN) in a wireless network by determining the SGSN revision of a GPRS core network from at least one bit received from the network;

if the bit has a value of "0", setting a Release 1997 (R97) compatible QoS information element in a message sent to the network; and if the bit has a value of "1", setting a Release 1999 (R99) compatible QoS information element in the message sent to the network.

28. A computer program as in claim 27, where the operation of determining the SGSN revision comprises an operation of reading a SGSNR (SGSN Release) field that is part of a SI 13 Rest Octets information element sent in a SYSTEM INFORMATION TYPE 13 message on a Broadcast Control Channel (BCCH).

29. A computer program as in claim 27, where the operation of determining the SGSN revision comprises an operation of reading a SGSNR (SGSN Release) field that is part of Packet System Information messages sent over a Packet Broadcast Control Channel (PBCCH).

30. A computer program as in claim 27, where the message sent to the network is one of an ACTIVATE PDP CONTEXT REQUEST Message, a MODIFY PDP CONTEXT REQUEST Message and an ACTIVATE SECONDARY PDP CONTEXT REQUEST Message.

31. A computer program embodied on a tangible computer-readable medium for directing a data processor during operation of a mobile station (MS), comprising an operation of:

adapting operation of the MS to Enhanced General Packet Radio Service (EGPRS) capabilities of a serving cell of a wireless network by performing operations of receiving a Temporary Block Flow (TBF) Resource Assignment message;

determining whether the cell supports EGPRS;

if the cell does support EGPRS, completely decoding the TBF Resource Assignment message; and if the cell does not support EGPRS, only partially decoding the TBF Resource Assignment message by terminating the decoding after the content specified for Release 1997 is decoded.

32. A computer program as in claim 31, where the TBF Resource Assignment message is an IMMEDIATE ASSIGNMENT for Downlink (DL) TBF establishment message.

* * * * *

UNITED STATES PATENT AND TRADEMARK OFFICE
CERTIFICATE OF CORRECTION

| | | |
|---|---|---|
| PATENT NO. | : 7,171,195 B2 | Page 1 of 1 |
| APPLICATION NO. | : 10/702913 | |
| DATED | : January 30, 2007 | |
| INVENTOR(S) | : Paivike et al. | |

It is certified that error appears in the above-identified patent and that said Letters Patent is hereby corrected as shown below:

IN THE CLAIMS:

Column 9, line 2, delete "RE" and replace with --RF--.

Column 9, line 8 delete "RE" and replace with --RF--.

Column 9, line 35 delete "RE" and replace with --RF--.

Signed and Sealed this

Seventeenth Day of April, 2007

JON W. DUDAS
*Director of the United States Patent and Trademark Office*